May 26, 1925.
J. W. TENNANT
WELDER'S ROD HOLDER
Filed Oct. 30, 1923
1,539,221
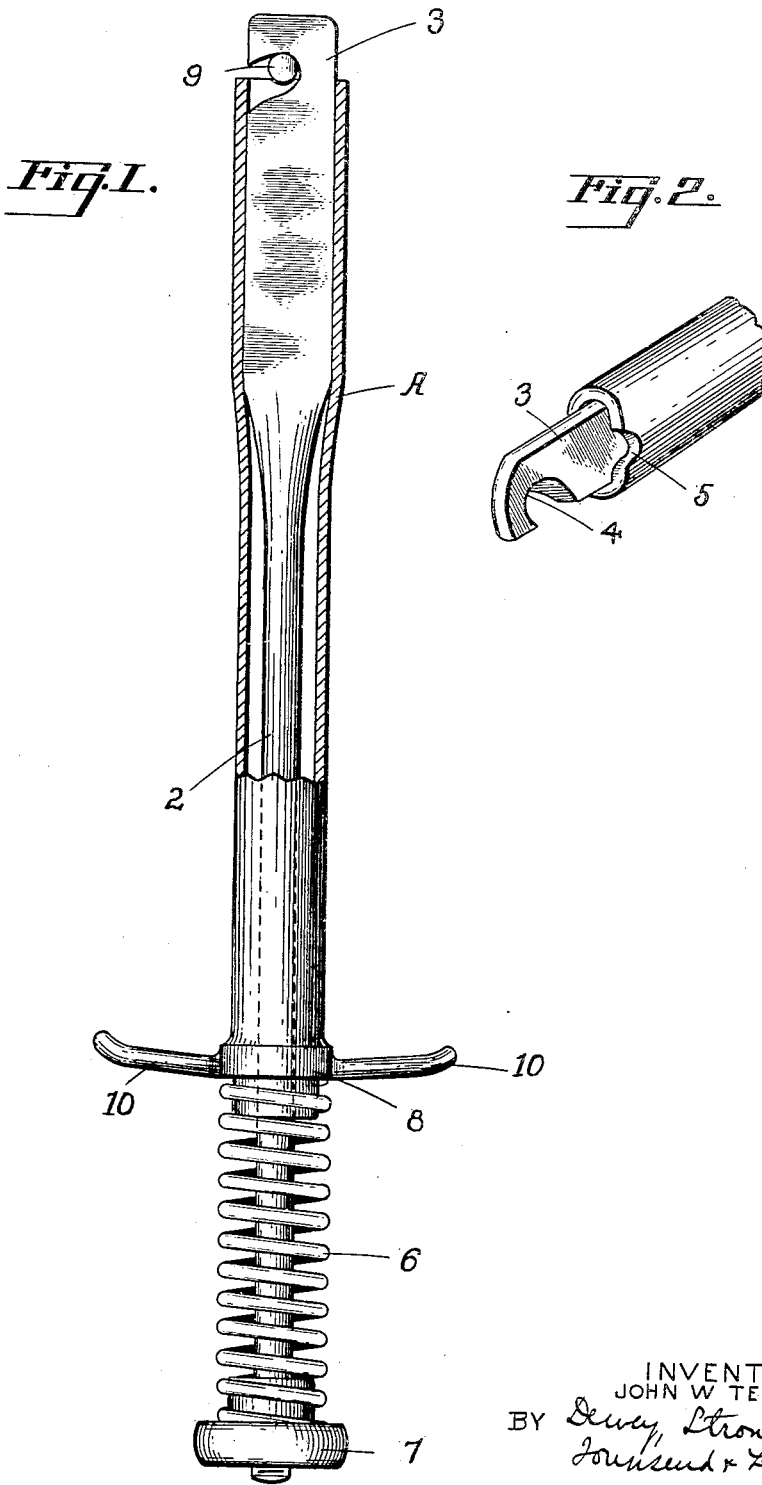

Patented May 26, 1925.

1,539,221

UNITED STATES PATENT OFFICE.

JOHN WILLIAM TENNANT, OF SALINAS, CALIFORNIA.

WELDER'S ROD HOLDER.

Application filed October 30, 1923. Serial No. 671,805.

*To all whom it may concern:*

Be it known that I, JOHN W. TENNANT, a citizen of the United States, residing at Salinas, county of Monterey, and State of California, have invented new and useful Improvements in Welders' Rod Holders, of which the following is a specification.

This invention relates to a welder's rod holder and especially to a rod holder adapted for use in conjunction with oxyacetylene torches and the like.

The object of the present invention is to generally improve and simplify the construction and operation of welders' rod holders; to provide a holder of this character which is light in weight and easy to handle and operate; to provide a holder which permits practically all of the rod to be consumed and which permits a new rod to be readily replaced and firmly gripped; and further, to provide a holder which may be turned so as to place the rod at the most convenient angle with relation to the torch and the work to be welded.

One form which my invention may assume is exemplified in the following description and illustrated in the accompanying drawings, in which—

Fig. 1 is a side elevation of the welder's rod holder, said side elevation being partially in section.

Fig. 2 is a perspective view of the gripping end of the rod holder.

Referring to the drawings in detail, and particularly to Fig. 1, A indicates a tube in which is slidably mounted a rod such as indicated at 2. One end of the rod extends through the tube and its outer end is threaded to receive a head member 7. A spring 6 surrounds the extended end of the rod and it is interposed between the head member and the end of the tube, its function being two-fold: first, that of retracting the rod as will hereinafter be described, and secondly, that of forming a handle by which the tube A is grasped. The forward end of the rod indicated at 2 is flattened as shown at 3 and it terminates in a hook-shaped member 4; this hook-shaped member being employed for the purpose of grasping the welding rod when the holder is in use. The forward end of the tube A is flattened to conform with the flattened end of the rod 3, thus forming a guide therefor and also preventing turning movement of the same. The flattened forward end of the tube is also recessed as indicated at 5 and as such cooperates with the hook-shaped end 4 to rigidly and firmly grip the welding rod when in place, such a rod being indicated at 9.

The holder here illustrated is particularly adapted for use in connection with oxyacetylene welding and the like. Such welding outfits are employed for brazing, welding and otherwise, and metal rods or wires of different materials are therefore employed. For instance, a brass rod may be used in connection with certain brazing work, while soft iron, wire or rod may be used for ordinary welding. The rods to be employed for welding or brazing are inserted between the recesses 5 and the hook-shaped end 4, and they are here thoroughly gripped and secured as the tension of the spring 6 is such as to hold the flattened end 3 inwardly, thus clamping the rod between the hood and the recesses 5: It is for this reason that the spring 6 serves two functions, first, that of retracting the hook-shaped member 4, and secondly, that of serving as a handle by which the tool or rod holder is grasped when in operation.

The device as a whole is exceedingly simple. It is grasped by means of the spring 6, which serves as a handle when in use. If it is desired to insert a rod, it is merely necessary to depress the rod by exerting pressure on the nut or head member 7. This compresses the spring 6 and forces the hook shaped end outwardly and away from the recesses 5 as shown in Fig. 2. The rod may then be inserted and pressure on the head member 7 released. This permits the hook-shaped end to retract itself and the rod is thus securely clamped and gripped between the hook 4 and the recesses 5. The rod may be inserted by hand or it may be picked up from the floor by merely engaging the rod with the hook and then retracting the hook so as to grip the rod. One hand is therefore all that is required in its operation and the other hand is free to hold a welding torch.

A pair of extended finger grips such as shown at 10 is employed to advantage as these may be gripped by the fingers so as to permit the palm of the hand to exert pressure on the head member 7 when the rod is to be released or replaced.

The tool is exceedingly simple in construction and quickly and easily operated. The rod 9, held by the hook, may be practically consumed as the torch can melt away thereon to within one-half or one-quarter of an inch of the hook without danger of burning or overheating the same. The small amount of heat conducted by the rod to the hook and the holder proper is readily dissipated by conduction into the tube A and even though this should become fairly warm, it is obvious that the handle will not become warm as air freely circulates through and around the spring 6. The rod holder can therefore be conveniently grasped at any time without danger of burning the hand or even feeling an uncomfortable temperature.

The holder here shown may be employed in connection with electric welding if desired, but certain parts would in that instance be constructed of insulating material. Its main use is for ordinary welding and brazing where oxyacetylene gas or the like is employed and it is there that it is most useful and applicable.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A rod holder of the character described comprising a tube, a rod slidably mounted therein, one end of said rod being flattened and projecting through one end of the tube, a hook-shaped member formed on the outer flattened end of the rod, said tube being also flattened to form a guide for the flattened end of the rod and to limit movement of the rod in one direction within the tube, and said flattened end having recesses formed therein to cooperate with the hook-shaped member, and a spring actuated handle on the opposite end of the rod and adapted to normally retract the flattened hook-shaped end of the rod with relation to the tube.

2. A device of the character described comprising an elongated tube, a rod slidably mounted therein, one end of the rod projecting through the tube and having a head member formed on its outer end, a handle on the tube, a spring interposed between said handle and the head member, a flattened portion formed on the opposite end of the rod, and a hook-shaped member in said flattened portion, and the adjacent end of the tube being flattened to form a guide for the flattened end of the rod and the hook carried thereby, and said flattened end of the tube having recesses formed therein cooperating with the hook and said flattened portion of the tube also limiting movement of the rod within the tube in one direction.

JOHN WILLIAM TENNANT.